(12) United States Patent
Lenger

(10) Patent No.: US 9,474,972 B2
(45) Date of Patent: Oct. 25, 2016

(54) GAMING MACHINE TRANSITIONS

(71) Applicant: Aristocrat Technologies Australia Pty Limited, North Ryde, NSW (AU)

(72) Inventor: Drazen Lenger, Rosebery (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 363 days.

(21) Appl. No.: 13/678,004

(22) Filed: Nov. 15, 2012

(65) Prior Publication Data

US 2013/0196758 A1 Aug. 1, 2013

Related U.S. Application Data

(63) Continuation of application No. 10/546,859, filed as application No. PCT/AU2004/000230 on Feb. 24, 2004, now abandoned.

(30) Foreign Application Priority Data

Feb. 24, 2003 (AU) .............................. 2003900809

(51) Int. Cl.
   *A63F 13/52* (2014.01)
   *G07F 17/32* (2006.01)
   *G06T 13/00* (2011.01)

(52) U.S. Cl.
   CPC .............. *A63F 13/52* (2014.09); *G06T 13/00* (2013.01); *G07F 17/32* (2013.01); *G07F 17/3202* (2013.01); *A63F 2300/66* (2013.01)

(58) Field of Classification Search
   CPC ........ A63F 13/02; A63F 13/04; A63F 13/06; A63F 13/08; A63F 13/10; A63F 13/12; A63F 2300/66; A63F 2300/663; A63F 2300/6638; A63F 2300/6653; A63F 2300/6692; G07F 17/32; G07F 17/3202; G06T 13/00
   See application file for complete search history.

(56) References Cited

U.S. PATENT DOCUMENTS 5,101,364 A * 3/1992 Davenport .............. G06T 11/60
                                                    345/619
5,359,712 A * 10/1994 Cohen .................. G11B 27/034
                                                    348/E5.051

(Continued)

FOREIGN PATENT DOCUMENTS

AU      200179477 A1    5/2002
WO      WO0174055 A1    10/2001

OTHER PUBLICATIONS

"ScreensaverMaker—Make Your Own Screensaver!" http://web.archive.org/web/20021126232239/http://www.scrmaker.com, Nov. 26, 2002. (See whole document.).

*Primary Examiner* — David L Lewis
*Assistant Examiner* — Matthew D. Hoel
(74) *Attorney, Agent, or Firm* — Armstrong Teasdale LLP

(57) ABSTRACT

A graphics system for changing images on a gaming machine display, having a transition library of transition types, a graphics engine and a control means. The graphics engine applies a selected transition type from the transition library to at least one of at least two images for determining the way in which a substitution of one of the images by the other of the images occurs and initializes transition data for effecting an incremental substitution of the one image by the other image. The control means modifies the transition data such that, when the selected transition type is being effected, an incremental substitution of at least a part of the one image by the other image occurs serially until the one image has been substituted by the other image on the gaming machine display.

7 Claims, 18 Drawing Sheets

(56) References Cited

U.S. PATENT DOCUMENTS

| | | | |
|---|---|---|---|
| 5,491,778 A * | 2/1996 | Gordon | G06T 13/80 345/640 |
| 5,640,522 A | 6/1997 | Warrin | |
| 5,664,082 A * | 9/1997 | Chen | G06T 3/60 345/648 |
| 5,680,535 A * | 10/1997 | Harbin | G06Q 99/00 345/473 |
| 5,766,074 A * | 6/1998 | Cannon | G07F 17/3211 463/16 |
| 5,793,985 A * | 8/1998 | Natarajan | H04N 19/51 375/240.01 |
| 5,810,665 A | 9/1998 | Takemoto et al. | |
| 5,933,834 A | 8/1999 | Aichelen | |
| 5,959,690 A * | 9/1999 | Toebes, VIII | G11B 27/105 348/578 |
| 5,982,389 A * | 11/1999 | Guenter | G06T 13/40 345/474 |
| 6,157,933 A | 12/2000 | Celi et al. | |
| 6,269,366 B1 * | 7/2001 | Romano | G06T 11/60 |
| 6,270,411 B1 * | 8/2001 | Gura | G07F 17/3244 273/138.2 |
| 6,290,600 B1 * | 9/2001 | Glasson | G07F 17/3265 273/143 R |
| 6,375,570 B1 * | 4/2002 | Poole | G07F 17/3227 463/20 |
| 6,388,661 B1 | 5/2002 | Richards | |
| 6,433,839 B1 * | 8/2002 | Siefken | G06T 13/00 348/173 |
| 6,517,432 B1 * | 2/2003 | Jaffe | G07F 17/32 463/16 |
| 6,551,187 B1 * | 4/2003 | Jaffe | G07F 17/32 463/16 |
| 6,580,466 B2 * | 6/2003 | Siefken | G06T 13/00 348/173 |
| 6,628,247 B2 * | 9/2003 | Toffolo | G09G 3/007 345/31 |
| 6,731,313 B1 * | 5/2004 | Kaminkow | G07F 17/3265 715/747 |
| 7,269,802 B1 * | 9/2007 | Kurzweil | G06F 17/2881 704/1 |
| 7,302,113 B2 * | 11/2007 | Pilu | G06K 9/00221 345/629 |
| 7,526,736 B2 | 4/2009 | Kaminkow et al. | |
| 7,699,699 B2 | 4/2010 | Gilliland et al. | |
| 7,735,026 B2 * | 6/2010 | Kurzweil | G06F 17/2881 704/1 |
| 7,785,191 B2 | 8/2010 | Marks et al. | |
| 7,980,936 B2 * | 7/2011 | Mead | G07F 17/32 463/16 |
| 8,271,333 B1 * | 9/2012 | Grigsby | G06F 17/30017 705/14.4 |
| 2002/0057386 A1 * | 5/2002 | Otera | 348/744 |
| 2002/0061065 A1 * | 5/2002 | Moore | H04N 19/61 375/240.13 |
| 2002/0075284 A1 * | 6/2002 | Rabb, III | G06T 3/0093 345/646 |
| 2002/0126224 A1 | 9/2002 | Lienhart | |
| 2003/0064801 A1 | 4/2003 | Breckner et al. | |
| 2005/0181347 A1 | 8/2005 | Barnes et al. | |
| 2006/0009286 A1 | 1/2006 | Durham et al. | |

\* cited by examiner

Figure  Abstract view of how scatter transition separates image.

Figure   drawing procedure for scatter once calculations have been done

GAMING MACHINE TRANSITIONS

FIELD OF INVENTION

This invention relates to gaming machines. More particularly, the invention relates to a system and method for changing images on a gaming machine display.

BACKGROUND OF THE INVENTION

When replacing one on-screen image with another in a gaming machine; the options available to perform this action in an interesting or aesthetically pleasing manner are limited. In fact, other than an instantaneous change, the only way is to use some form of pre-generated animation. This method, apart from consuming a large amount of EPROM space, is unwieldy and cumbersome given that the starting and end images must be known before run-time.

In filmmaking, when going from one scene to another, filmmakers have used a number of techniques. Theses techniques range from fading from a scene to black, and then fading from black into the next scene. Other options are fading directly from one scene to another, shrinking a scene to reveal another "behind it", or sliding one scene off the screen to the left whilst simultaneously sliding another onto the screen from the right. All these techniques are generated post-filming and are fixed.

SUMMARY OF THE INVENTION

According to a first aspect of the invention there is provided a graphics system for changing images on a gaming machine display, the system comprising:
  a transition library of transition types;
  a graphics engine to apply a selected transition type from the transition library to at least one of at least two images for deter fining the way in which a substitution of one of the images by the other of the images occurs and for initialising transition data for effecting an incremental substitution of the one image by the other image; and
  a control means for modifying the transition data such that, when the selected transition type is being effected, an incremental substitution of at least a part of the one image by the other image occurs serially until the one image has been substituted by the other image on the gaming machine display.

In a preferred embodiment as an initial step, a second of the images is initially placed behind a first of the images. The first image may be incrementally removed by the transition type to reveal or expose at least a part of the second image until the first image has been entirely removed to reveal the second image.

The transition library may include slide, wipe, scatter, fade, iris, shrink, curtain or rotate transitions. The selected transition type or selected transition may change the first image to the second image using a shape. The iris transition may use a circle. The wipe transition may use a line. The scatter transition may use a square.

The selected transition may be drawn using pixel operations, scaling, micro-clipping or OpenGL operations.

The selected transition may have a pre-determined duration. The selected transition may coincide with a sound or animation. The selected transition may start and reset based on a pre-determined time.

At least one of the images may be an animation. In the preferred embodiment, only the second image is an animation. The images may be bitmap images, hereinafter referred to as 2D images. The images may be vector images, hereinafter referred to as 3D images. The selected transition may be in 2D mode if the first or second images are 2D images.

In 2D mode, the image may be divided into smaller shapes. A pre-determined number of smaller shapes may be filled for each refresh period of the gaming machine display.

In 3D mode, the transition data may include a callback function that is attached to the selected transition. A Display Manager window, may be created for the callback function. The callback, function may draw the selected transition on the gaming machine display using OpenGL calls. The callback function may draw the selected transition on the gaming machine display by incrementally exposing less of the first image for each refresh period.

The first image may exist in a scene list. The selected transition may be added in the same position of the first image in the scene list.

A duplicate image of the first image may be added to the scene list for modification. The transition data for the duplicate image may be initialised.

The transition data may be generated and/or modified at every refresh period of the gaming machine display.

The transition data may be a duplicate image of the first image.

Transition data may include the transition type, the duration of the selected transition, the current state of the selected transition.

An offscreen Device Context may be created for receiving a copy of the duplicate image. The first image may be removed after the Device Context is created.

The duplicate image in the offscreen Device Context may be added to a Display Manager. The image may be removed from the Display Manager when the selected transition is completed. Memory may be freed when the selected transition is removed from the Display Manager.

Each image in a scene list may be checked to determine if it has transition data. Each image having transition data may have a draw handler.

Parts of the first image to be replaced per refresh period may be calculated such that the selected transition is completed within a pre-determined time. The pre-determined time may beset by a user at run-time.

According to a second aspect of the invention, there is provided a method for changing images on a gaining machine display, the method comprising the steps of:
  selecting a transition from a transition library of transition types;
  applying the selected transition to at least one of at least two images for determining the way in which a substitution of one of the images by the other of the images occurs;
  initialising transition data for effecting an incremental substitution of the one image by the other image; and
  modifying the transition data such that, when the selected transition type is being effected, an incremental substitution of at least a part of the one image by the other image occurs serially until the one image has been substituted by the other image on the gaming machine display.

According to a third aspect of the invention, there is provided a gaming machine having a gaining machine display, the gaining machine comprising:

a graphics system to change images on the gaming machine display, the graphics system including:

a transition library of transition types;

a graphics engine for applying a selected transition type from the transition library to at least one of at least two images for determining the way in which a substitution of one of the images by the other of the images occurs and for initialising transition data for effecting an incremental substitution of the one image by the other image; and a control means for modifying the transition data such that, when the selected transition type is being effected, an incremental substitution of at least a part of the one image by the other image occurs serially until the one image has been substituted by the other image on the gaming machine display.

Advantageously, transitions enable gaming machines to change images on the gaining display in a variety of ways over a variable time period without using pre-generated animations. That is, any image that exists on a gaming machine display can be made to disappear and reappear aesthetically at run-time. Preferably, by placing a second image under the first image before the start of a transition, the second image can be exposed and effectively replace the first image using any of the transitions provided by the graphics engine.

According to a fourth aspect of the invention there is provided computer program means for directing a graphics engine and a control means to execute a procedure to change images in a graphics system on a gaining machine display, the graphics system having a transition library of transition types, the computer program means directing:

the graphics engine to apply a selected transition type from the transition library to at least one of at least two images for determining the way in which a substitution of one of the images by the other of the images occurs and for initialising transition data for effecting an incremental substitution of the one image by the other image;

the computer program means further directing the control means to modify the transition data such that when the selected transition type is being effected, an incremental substitution of at least a part of the one image by the other image occurs serially until the one image has been substituted by the other image on the gaming machine display.

According a fifth aspect of the invention there is provided computer program means for directing a graphics engine and a control means to execute a procedure to change images on a gaming machine display by:

selecting a transition type from a transition library of transition types;

applying the selected transition type to at least one of at least two images for determining the way in which a substitution of one of the images by the other of the images occurs;

initialising transition data for effecting an incremental substitution of the one image by the other image;

modifying the transition data such that when the selected transition type is being effected, an incremental substitution of at least a part of the one image by the other image occurs serially until the one image has been substituted by the other image on the gaming machine display.

According to a sixth aspect of the invention there is provided a computer readable memory, encoded with data representing a computer program for directing a graphics engine and a control means to execute a procedure to change images on a gaming machine display by:

selecting a transition type from a transition library of transition types;

applying the selected transition type to at least one of at least two images for determining the way in which a substitution of one of the images by the other of the images occurs;

initialising transition data for effecting an incremental substitution of the one image by the other image;

modifying the transition data such that when the selected transition type is being effected, an incremental substitution of at least a part of the one image by the other image occurs serially until the one image has been substituted by the other image on the gaining machine display.

BRIEF DESCRIPTION OF THE DRAWINGS

An example of the invention will now be described with reference to the accompanying drawings, in which.

DETAILED DESCRIPTION OF THE DRAWINGS

Figure 1:
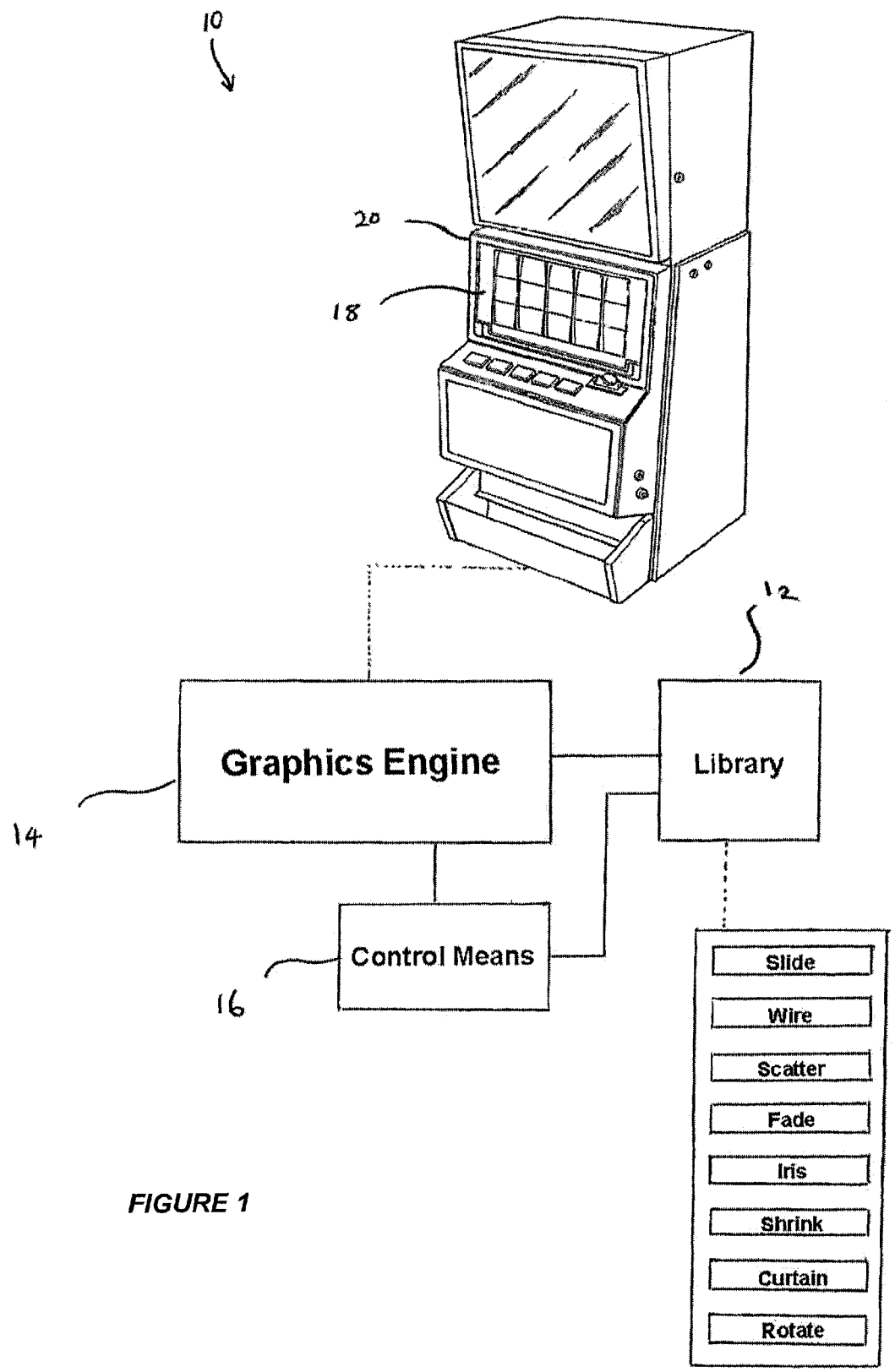
FIG. 1 is a block diagram of the graphics system.

Referring to FIG. 1, a graphics system 10 for a gaming machine 20 comprises a transition library 12 which stores various types of transitions, for example, slide, wipe, scatter, fade, iris, shrink, curtain and rotate transitions. The graphics system 10 also provides a graphics engine 14 to apply a selected transition type from the transition library 12 to one of two images for determining the way in which a substitution of a first image by a second image occurs. The graphics engine 14 also initialises transition data (t_data) for effecting an incremental removal of the first image to reveal the second image. A control means 16 modifies the transition data (t_data) such that when the selected transition type is being effected, an incremental removal of at least a part of the first image by the second image occurs serially until the first image has been removed in its entirety to reveal the second image on a display 18 of the gaining machine 20.

Figure 2:
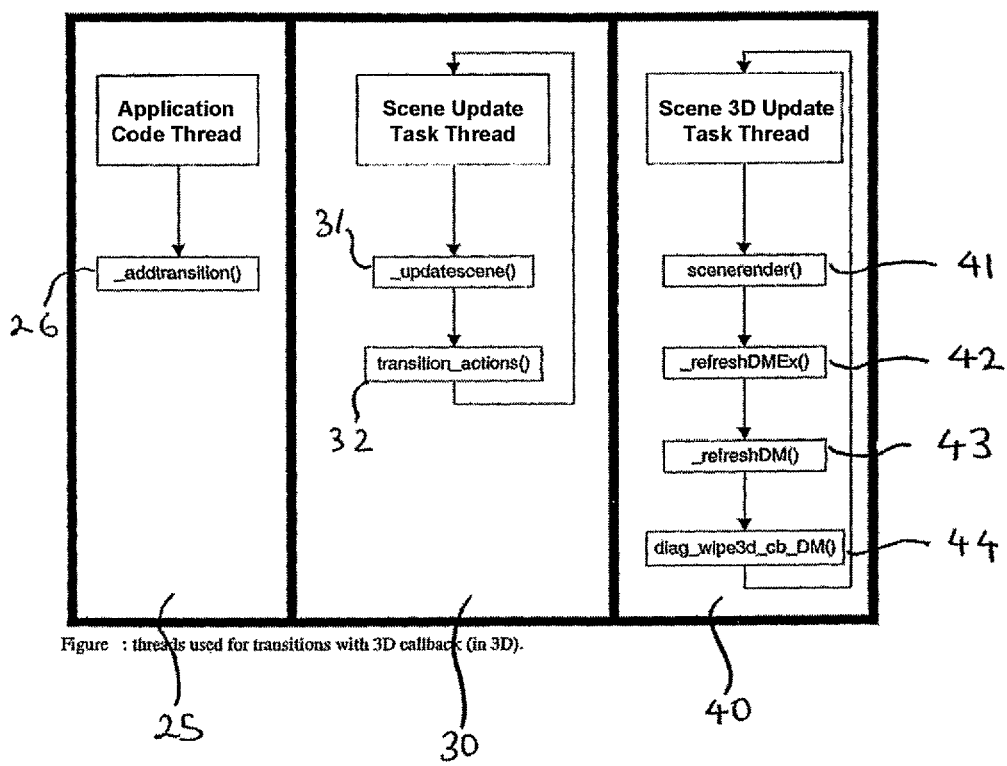
FIG. 2 is a process flow diagram of a 3D transition using 3D callback.

Referring to FIG. 2, the graphics engine 14 executes an application code thread 25, scene_update_task thread 30 and scene3d_update_task thread 40. There are three main functions to facilitate image transitions. Firstly, the application code thread 25 has an _addtransition( ) function 26 which selects a transition and initialises its transition data (t_data) structure and attaches it to an image. Secondly, the scene_update_task thread 30 has an _updatescene( ) function 31 which interrogates images within the scene list to determine whether they have transition data (t_data). Thirdly, if transition data (t_data) is found, the transition_actions( ) function 32 of the scene_update_task thread 30 is called to maintain and/or update the selected transition.

The scene3d_update_task thread 40 is used for 3D images and is provided with functions including: scenerender( ) 41, _ refreshDMEx( ) 42, refreshDM( ) 43 and a 3D transition callback function, diag_wipe3d_cb_DM( ) 44. The scene3d_update_task thread 40 calls _refreshDM( ) 43 to call the 3D transition callback function 44. The callback function 44 uses the transition data (t_data) attached to the image to draw the selected transition via OpenGL calls. For any individual transition, the application code 25 and scene_update_task 30 threads cannot run concurrently. Also, the scene3d_update_task 40 and scene_update_task 30 threads cannot run concurrently.
addtransition( )

Figure 4:
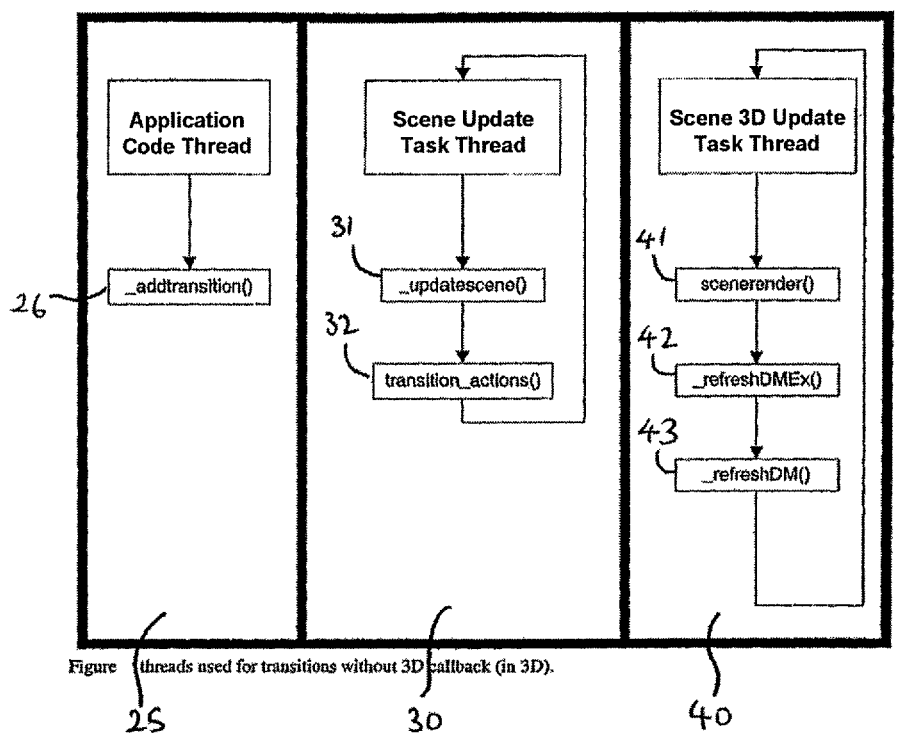
FIG. 4 is a process flow diagram of a 3D transition not using 3D callback.
Figure 5:
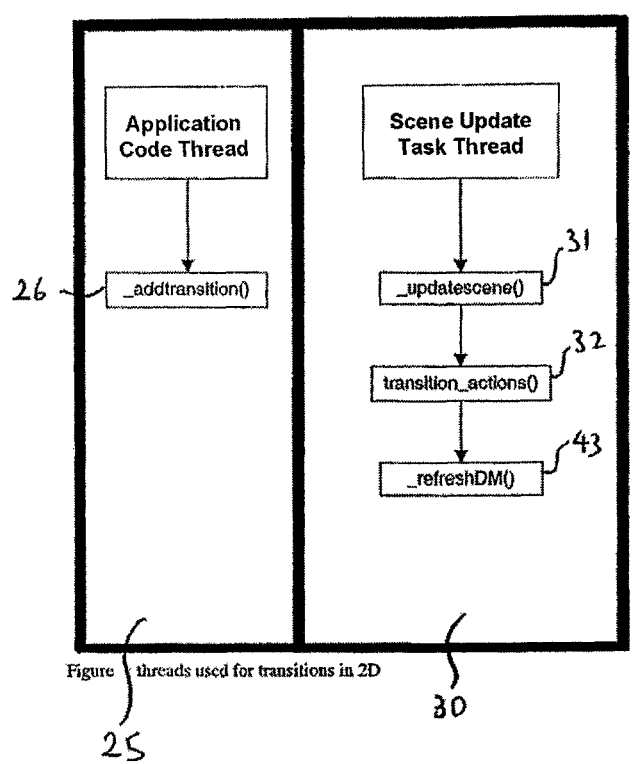
FIG. 5 is a process flow diagram of a 2D transition.

Referring to FIGS. 2, 4 and 5, the application code thread 25 calls the _addtransition( ) function 26 to attach the selected transition to an image. Applying a transition to an image requires the name and position of the subject image to be known. Unless these are correct, the transition command is ignored. The command itself both identifies the subject image and specifies the transition parameters as shown in the code below:

```
Transition_scene_id = addtransition
    (
        image identifier,
        screen position x,
        screen position y,
        transition type,
        direction,
        duration
    )
```

The variable "Transition_scene_id" is used with the existing graphics commands to both start and reset the transition at desired times. Resetting a transition is useful to reveal several consecutive images, or if the transition has been interrupted by another gaming machine event.

When _addtransition( ) 26 is called, the selected transition assumes that the image already exists in the scene list and DM (Display Manager). An example of calling the _addtransition( ) function 26 is shown below:

```
H_OBJECT tmp;
tmp = getobjecthandle("IMG_SYM_TEN", _IMAGE);
s_id1 = addscene(tmp, 100, 100, 0, 0, HIGHER_PRI);
t_id1 = addtransition(tmp, 100, 100, SLIDE, TOP_LEFT, 3200);
_controlscene(s_id1, SCENE_START);
_controlscene(t_id1, SCENE_START_TRANS);
```

The transition (t_id1) is added in the same position that the image exists in for the scene (s_id1). If this procedure is not met, then _addtransition( ) 26 will fail. The following code extract shows how _addtransition( ) 26 searches for the resource in the DM (Display Manager) and checks if the resource is in the same location that the user wants to attach the transition to.

```
DmItem = FindResourceDM(pImage->hDc, -1);
_getitempositionDM(DmItem, &Rect);
```

```
while (DmItem != -1)
{
    if (Rect.top == yPos && Rect.left == xPos)
    {
        _getscenedataDM(DmItem, &scene_id);
        break;
    }
    else
    {
        DmItem = FindResourceDM(pImage->hDc, DmItem);
        _getitempositionDM(DmItem, &Rect);
    }
}
...
// Could not find the object at that spot.
    if (DmItem == -1)
        return GRERROR;
```

Next, _addtransition( ) 26 adds a duplicate of the image to the scene list so that it can modify the duplicate image for the transition.

_addtransition( ) 26 also initialises all transition data (t_data) variables for the associated duplicate image. Below is a code extract that details the initialisation of the transition data (t_data).

```
scene_list[new_scene_index].t_data = (TRANS_ITEM *)
    _avlmalloc(sizeof(TRANS_ITEM))
scene_list[new_scene_index].t_data->swansong = swansong;
scene_list[new_scene_index].t_data->direction = dir;
scene_list[new_scene_index].t_data->duration = dur;
scene_list[new_scene_index].t_data->status =
    NOT_YET_STARTED;
scene_list[new_scene_index].t_data->curr_x = 0;
scene_list[new_scene_index].t_data->curr_y = 0;
scene_list[new_scene_index].t_data->generic1 = 0;
scene_list[new_scene_index].t_data->generic2 = 0;
scene_list[new_scene_index].t_data->generic3 = 0;
scene_list[new_scene_index].t_data->generic4 = 0;
scene_list[new_scene_index].t_data->generic5 = 0;
scene_list[new_scene_index].t_data->generic6 = 0;
scene_list[new_scene_index].t_data->cllbckDMitem = -1;
scene_list[new_scene_index].t_data->randomlist = (NLIST *) 0;
scene_list[new_scene_index].t_data->randomlist3D = (int *) 0;
```

Many of the variables within the t_data structure are dependent on the type of transition chosen, however some are present for all transitions. Below is a table explaining the variables of the t_data structure.

| T_data variable | Meaning |
| --- | --- |
| swansong | Type of transition |
| direction | Depends on transition chosen as different transitions have different Subtypes/directions |
| duration | Length of transition |
| status | Current state of the transition |
| generic1-generic6 | All these variables are different for each transition |
| cllbckDMitem | This refers to the callback function that is attached to the transition in 3D mode when a window is created. |
| randomlist | This is the list of squares to be removed. Specific for the SCATTER transition in 2D mode. |
| randomlist3D | This is the list of squares to be removed. Specific for the SCATTER transition in 3D mode. |

If the selected transition requires modification of the original image, for example, the "Iris Wipe" transition, an offscreen DC (Device Context) is created for a duplicate transition image. Below is a list of transitions that do not require an offscreen DC (Device Context) to be created.

| Transition | 2D/3D |
|---|---|
| ROTATE | 3D |
| SHRINK | ANY |
| SLIDE | ANY |
| FADE | 3D |
| WIPE | ANY, wipes in left, right, up and down do not need to create a DC either as we are doing micro clipping and this does not affect the original image. |
| IRIS | 3D |
| SCATTER | 3D |
| CURTAIN | 3D |

Figure 3:
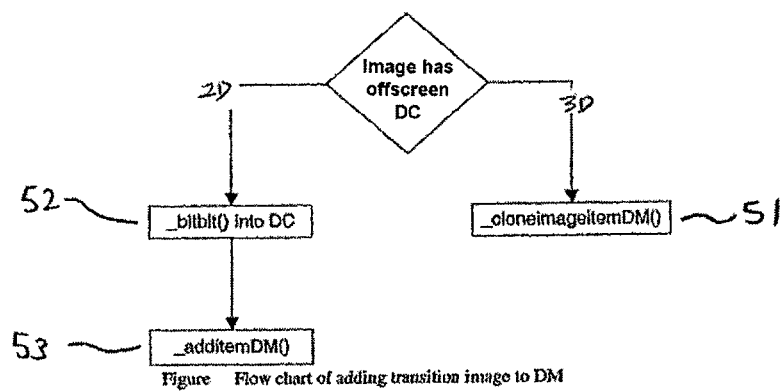
FIG. 3 is a process flow diagram of adding a transition image to the Display Manager.

Referring to FIG. 3, when an offscreen DC (Device Context) has been created for a duplicate transition image, the original image is removed. In 3D mode after the offscreen DC has been created, cloneimageitemDM( ) 51 is called which adds the transition image DC to the DM (Display Manager). However, in 2D mode, a _bitblt( ) 52 is done to copy the duplicate image to the DC. Next, _additemDM( ) 53 is called to add the transition image DC to the DM (Display Manager).

For error handling purposes, applying a transition to a resource other than an image results in_addtransition( ) 26 returning an error.

updatescene( )

In the image transition process, the updatescene( ) function 31 is called for each refresh of the gaming display 18. Also, each image to be displayed is checked to see if it contains any transition data. If the image contains transition data (t_data) and the transition is in progress, transition_actions( ) 32 is called as shown in the code extract below:

```
if (scene_list[i].t_data != 0 && scene_list[i].t_data->status ==
IN_PROGRESS)
    transition_actions(i, &callback_reqd);
``` transition_actions( )

Transitions are maintained and updated by the transition_actions( ) function 32. Transitions can be updated using pixel operations or whole image operations, for example, scaling. The transition_actions( ) function 32 modifies all the transition data (t_data) for the next refresh of the display 18. Each individual transition contains unique algorithms and procedures to remove parts of the image from the display 18. However, some of the transitions within transition_actions( ) 32 only have a 2D implementation. Other transitions have a 2D and 3D implementation. The transitions that are only available in 2D use a specific 3D callback function 44 to cater for those, transitions in 3D mode.

If in 3D mode, the first time transition_actions( ) 32 is called, a DM (Display Manager) window is created at the location of the image and attaches a 3D callback function 44 to this window. At every refresh, transition_actions( ) 32 modifies all the t_data. Also, the 3D callback function 44 attached to this window processes the t_data structure and implements the transition using OpenGL calls. The code extract below illustrates the initialisation of the DM (Display Manager) window with a scatter_3D_cbDM( ) callback 44.

```
scene_list[i].t_data->cllbckDMitem = _addwindowDM
    (
    Rect.left,
    Rect.top,
    scatter_3D_cbDM,
    DI_ALPHA,
    i,
    get_priority(i),
    Rect.top>=0?DM_BOTTOM_SCREEN:DM_TOP_SCREEN
    );
```

Below is a list of the associated 3D callback functions 44 for each transition.

| Transition | 3D Callback |
|---|---|
| WIPE (any diagonal direction) | diag_wipe_3D_cbDM |
| SCATTER | scatter_3D_cbDM |
| IRIS | iris_3D_cbDM |
| CURTAIN (type 2) | curtain2_3D_cbDM |
| CURTAIN (type 1) | curtain1_3D_cbDM |

Figure 6:
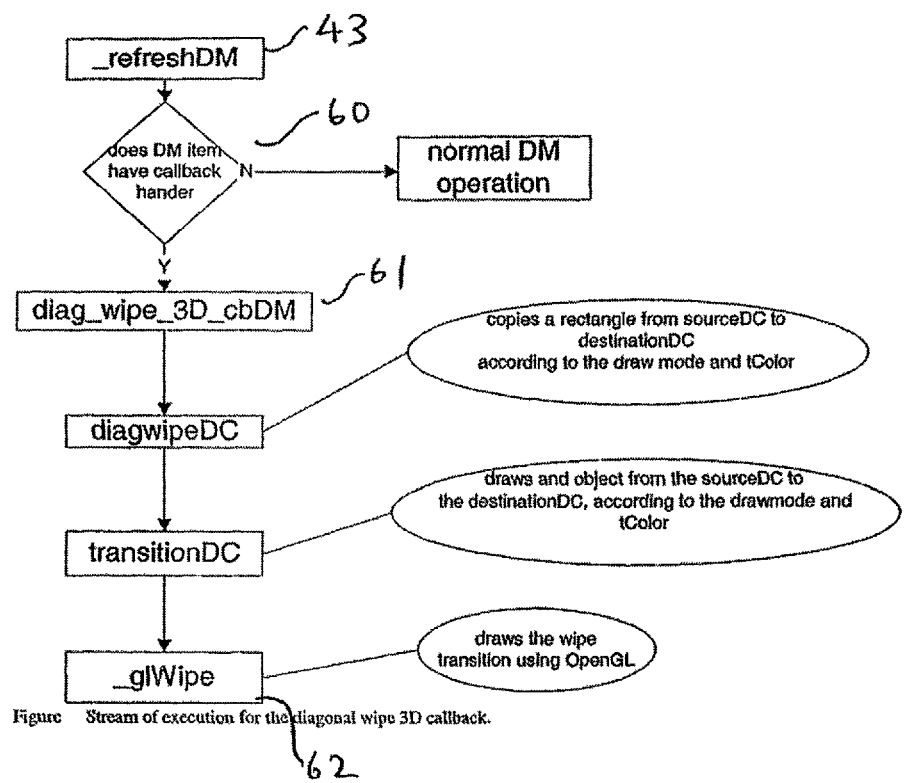
FIG. 6 is a process flow diagram of a diagonal wipe 3D callback.

Referring to FIGS. 4 to 6, not all transitions require their own callbacks 44 in 3D mode. This is determined according to the implementation or specification of individual transitions. For example, the Wipe transition in any non-diagonal direction uses micro clipping. Thus for this transition there is no need for OpenGL operations.

Referring to FIG. 4, _refreshDM( ) 43 does not call a 3D transition callback 44 since transition_actions( ) 32 has ensured that the transition data (t_data) has been updated or modified for the next refresh of the display 18. This is different to the scenario shown in FIG. 2. Also, in this scenario, the application code 25 and the scene_update_task 30 threads do not run concurrently and the scene3d_update_task thread 40 also does not run concurrently.

Referring to FIG. 5, _refreshDM( ) 43 is called in the context of the scene_update_task thread 30. There are also no 3D callbacks in 2D mode and transition_actions( ) 32 has ensured that the transition data (t_data) is updated and modified for the next refresh. Also, the application code 25 and scene_update_task( ) 30 threads do not run concurrently.

Referring to FIG. 6, _refreshDM( ) 43 is called in the stream of execution for the diagonal wipe transition. When _ refreshDM( ) 43 is called, each DM (Display Manager) item is drawn and checked to see if it has a draw handler attached 60. If the image has a transition attached to it then the attached draw handler is initiated 61. In the diagonal wipe transition, diag_wipe_3D_cbDM( ) is called 61. The Wipe transition is drawn using OpenGL calls 62. The code extract below illustrates the operation of _refreshDM( ) 43 with draw handlers.

```
for (i = 1; i < DmItemsUsed; i++)
{
    ...
    if (pItem->pDrawHnd && (pItem->WhichScreen &
    DM_BOTTOM_SCREEN))
    {
    (pItem->pDrawHnd) (hBack,
        pItem->Rect.left,
        pItem->Rect.top,
        pItem->DrawMode,
        pItem->Val);
      continue;
    }
}
```

Figure 7:
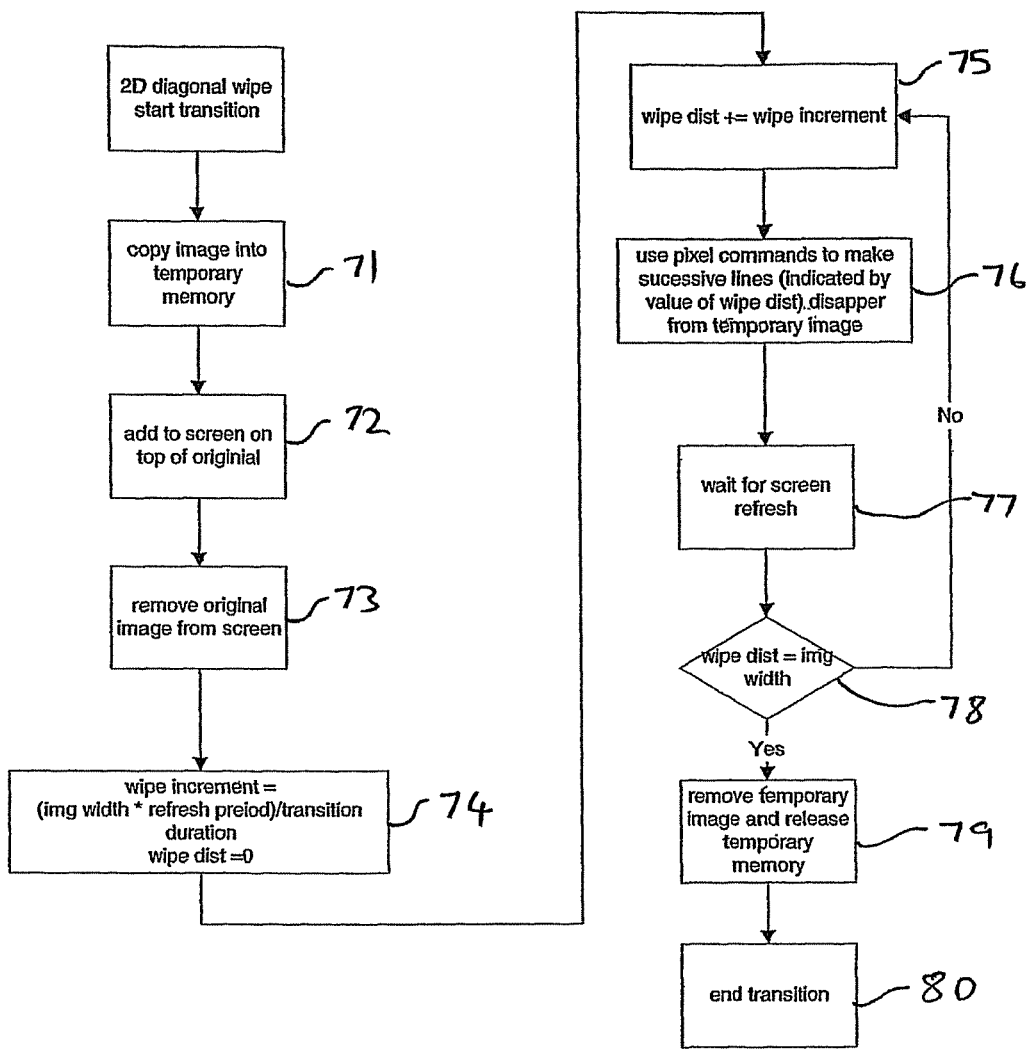
FIG. 7 is a process flow diagram of a 2D diagonal wipe transition.

Referring to FIG. 7, the original image is copied into temporary memory 71 for a diagonal wipe transition in 2D mode. The duplicate image is added to the display 18 over the original image 72 and the original image is removed 73 from the display 18. The wipe increment is calculated according to the formula shown at step 74. The amount of the image that has been "wiped" is stored in the variable wipe dist, and is incremented at step 75. Then, pixel commands cause successive lines to disappear from the temporary image 76 on the gaming machine display 18. When waiting 77 for the next refresh of the display 18, the variable wipe dist is compared with the variable img width to determine if more "wiping" is necessary 78. If the value of wipe dist is not equal to the img width variable, steps 75 to 78 are repeated. However, if wipe dist is equal to img width, the temporary image is removed and the temporary memory is released 79 ending the transition 80.

In 3D mode, different commands are used for step 76 instead of pixel commands to draw the transition. For example, OpenGL triangle commands could be used.

Scatter Transition Example

Figure 8:
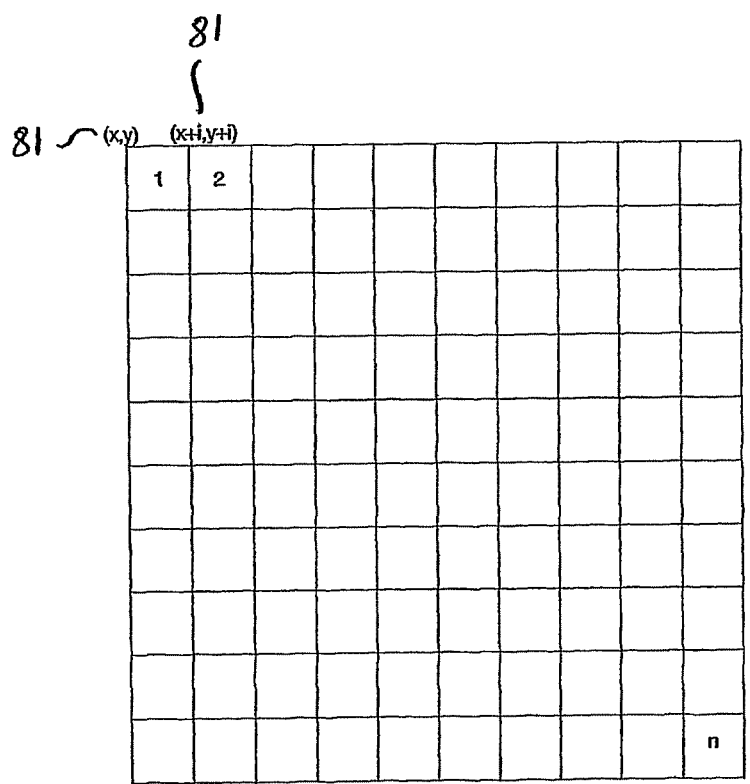
FIG. 8 illustrates how the scatter transition separates an image.

The Scatter transition receives a value (direction parameter) from the _addtransition( ) function 32. The direction parameter value is the size of the individual scattered squares, which is represented as a $1000^{th}$ of a percent of the image area. For example, a value of 2500 is a square size that is 25% of the image area. The Scatter transition then determines the number of squares needed for the transition and calculates the position of the top left corner of each square 81 and assigns this value to each square. FIG. 8 illustrates the separation of the image by the Scatter transition. The lists of squares (1-n) are randomly selected so that a random square is deleted from the image.

The t_data structure for the Scatter transition has eight variables that are used for cumulative transition calculations. It is not known until the implementation of the transition algorithm is complete whether more variables are required.

Transition_actions( ) 32 is modified for the Scatter transition. This modification includes the transition algorithm and the correct timing, so that the transition is completed within a user specified time. Below is an excerpt of the initialisation of the scatter transition in transition_actions( ) 32.

```
case SCATTER:
{
    if (t_data->generic1 == 0 && t_data->generic2 == 0)
    {
        /* get square size based on area of image */
        img_area = width * height;
        square_size = img_area * t_data->direction / 10000;
        // generic5 is the square size.
        square_size = t_data->generic5 = mborg_isqrt((long)square_size);
        // generic3 is the number of x divisions. generic4 is the number of y divisions
        t_data->generic3 = (width % square_size != 0) ? width / square_size + 1 width / square_size;
        t_data->generic4 = (height % square_size != 0) ? height / square_size + 1 height / square_size;
        no_of_squares = t_data->generic3 * t_data->generic4;
        /* allocate space for rand numbers */
        t_data->randomlist = avlmalloc(sizeof(NLIST)*no_of_squares);
        make_rand_array(square_size, no_of_squares, t_data->randomlist, width, t_data->generic3);
        if (Is3D)
        {
            RECT Rect;
            _getitempositionDM(scene_list[i].imagelist[0], &Rect);
            scene_list[i].t_data->cllbckdDMitem = addwindowDM
            (
            Rect.left,
            Rect.top,
            scatter_3D_cbDM,
            DI_ALPHA,
            i,
            get_priority(i),
```

```
        Rect.top>=0 ?DM_BOTTOM_SCREEN:DM_TOP_SCREEN
        );
        _invalidateitemDM(scene_list[i].t_data->cllbckDMitem, 0);
        uninvalidateitemDM(scene_list[i].imagelist[0]);
        t_data->randomlist3D = avlmalloc(sizeof(int) * no_of_squares);
        for (j = 0; j < no_of_squares; j++)
            t_data->randomlist3D[j] = 1;
    }
}
...
```

To illustrate the process of initialisation, the code above is executed once at the start of the transition to split up the image into numbered squares as shown in FIG. 8. Also, during initialisation, a Display Manager window is created for a 3D callback 44.

Generally, each transition has a shape that is derived from the transition. For example, the iris wipe transition has a circle and the wipe has a line. For the Scatter transition, this is a square. In relation to timing, the number of squares to remove per refresh period is based on the duration value passed from _addtransition( ) 26. The code extract below illustrates the number of squares to remove per refresh period (spf).

```
/* timing */
lpf_1000 = ((no_of_squares * fbp) / t_data->duration);
t_data->generic2 += lpf_1000;
spf = t_data->generic2 / 1000;
t_data->generic2 %= 1000;
```

The lpf_1000 variable holds the squares to remove per refresh period ×1000 to reduce rounding errors. The lpf_1000 variable is added to the t_data→generic2 variable which is divided by 1000 to produce the final value for the number of squares to be removed for the current refresh period (spf). The remaining lines are stored in t_data→generic2 for the next refresh period.

Once the spf is calculated, a for loop is executed to remove a certain number of squares from the image per refresh period. The following code segment illustrates this.

```
for(j=0;j<spf;j++)
{
    /* create random rectangle to clear */
    area.left = t_data->randomlist[t_data->generic1].x - x_offset;
    area.top = t_data->randomlist[t_data->generic1].y - y_offset;
    area.right = t_data->randomlist[t_data->generic1].x + t_data->generic5 - x_offset;
    area.bottom = t_data->randomlist[t_data->generic1].y + t_data->generic5 - y_offset;
    /* for squares that fall off the DC */
    area.left = (area.left <0) ? 0 : area.left;
    area.top = (area.top <0) ? 0 : area/top;
    area.right = (area.right > width) ? width : area.right;
    area.bottom = (area.bottom > height) ? height : area.bottom;
    SoftFill(scene->playDc[0],&area,0);
    t_data->generic1++;
    if(t_data->generic1 == no_of_squares)
    {
        remove=TRUE;
        /* free all dynamic allocated memory */
        _avlfree(t_data->randomlist);
        t_data->randomlist = (NLIST *) 0;
        break;
    }
}
```

Figure 9:
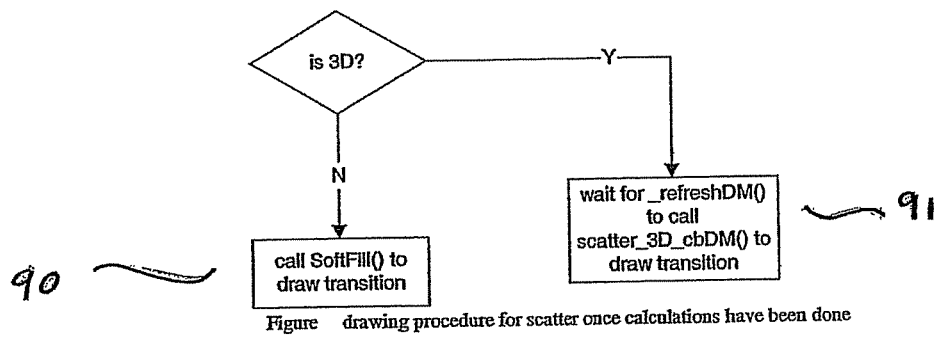
FIG. 9 is a process flow diagram for the drawing procedure of the Scatter transition.
Figure 10A:
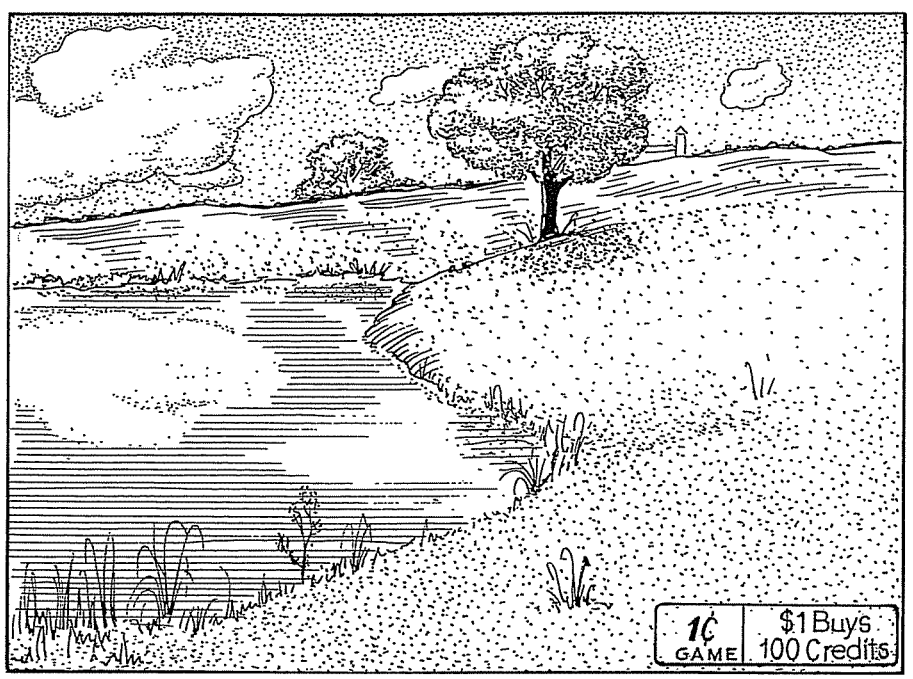
FIGS. 10a-e are a series of images illustrating the Wipe transition.
Figure 10B:
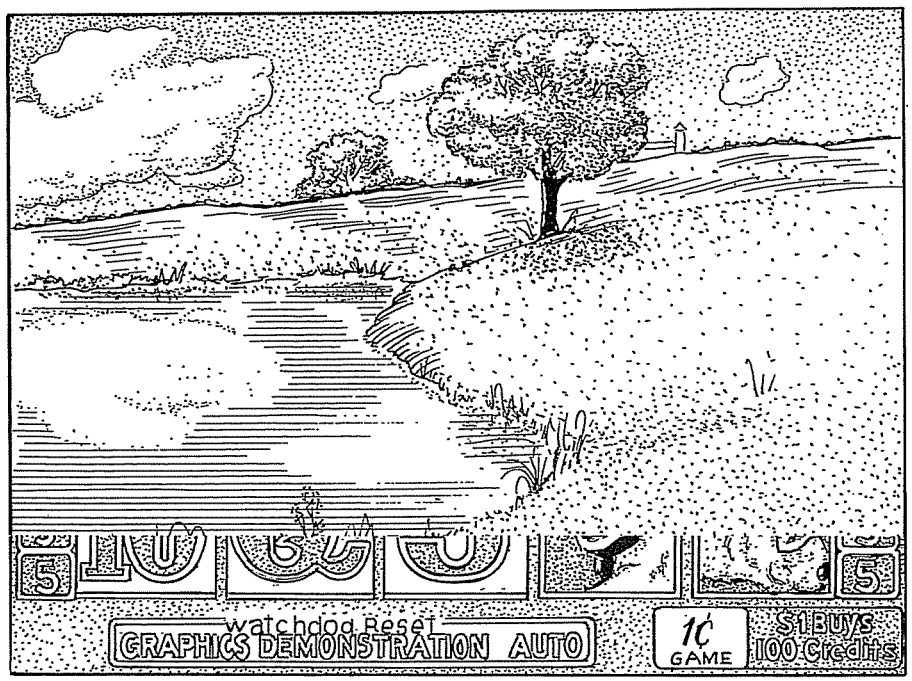
Figure 10C:
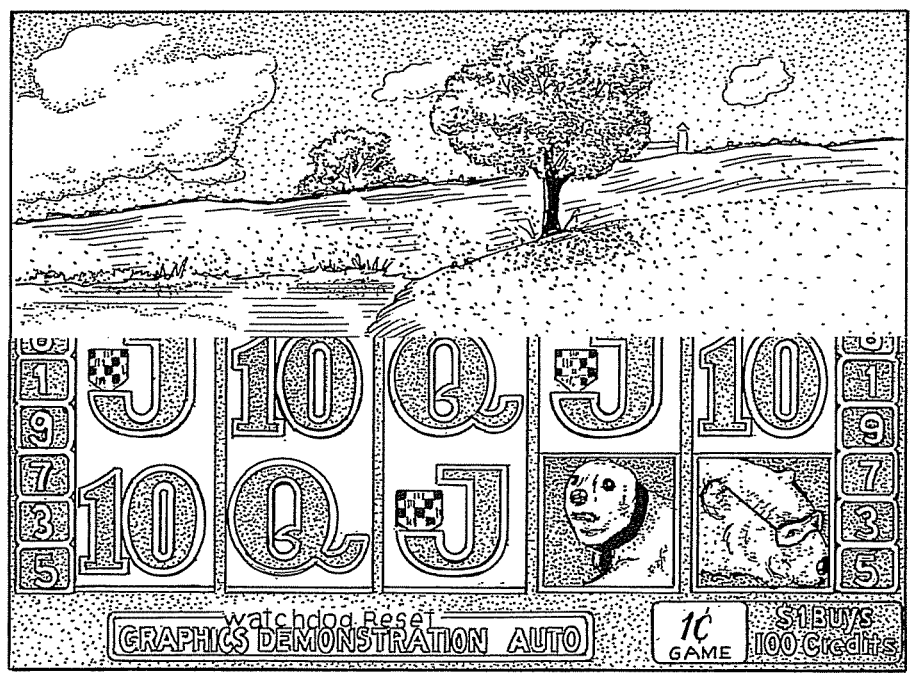
Figure 10D:
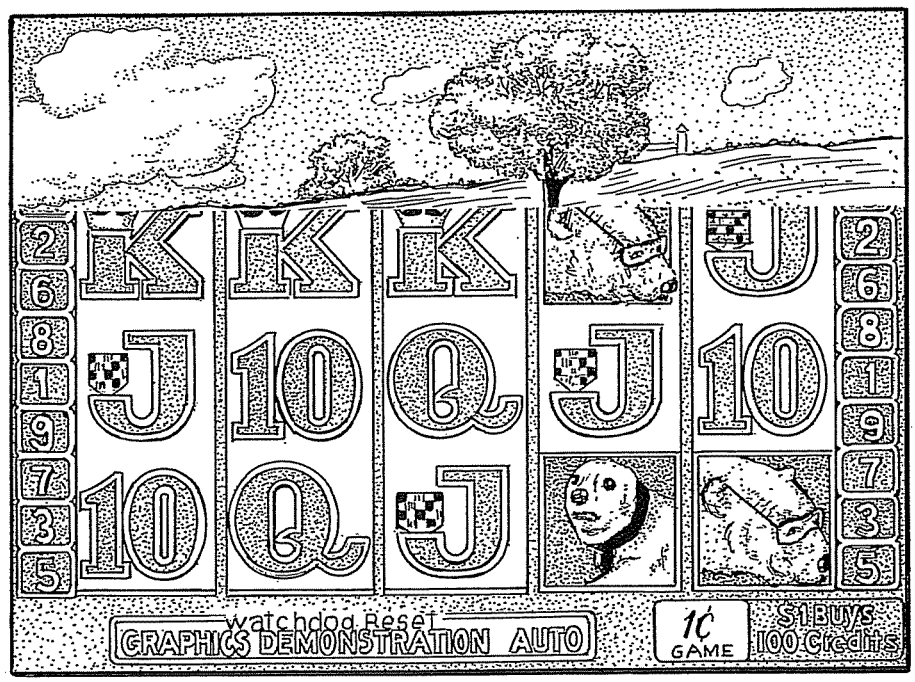
Figure 10E:
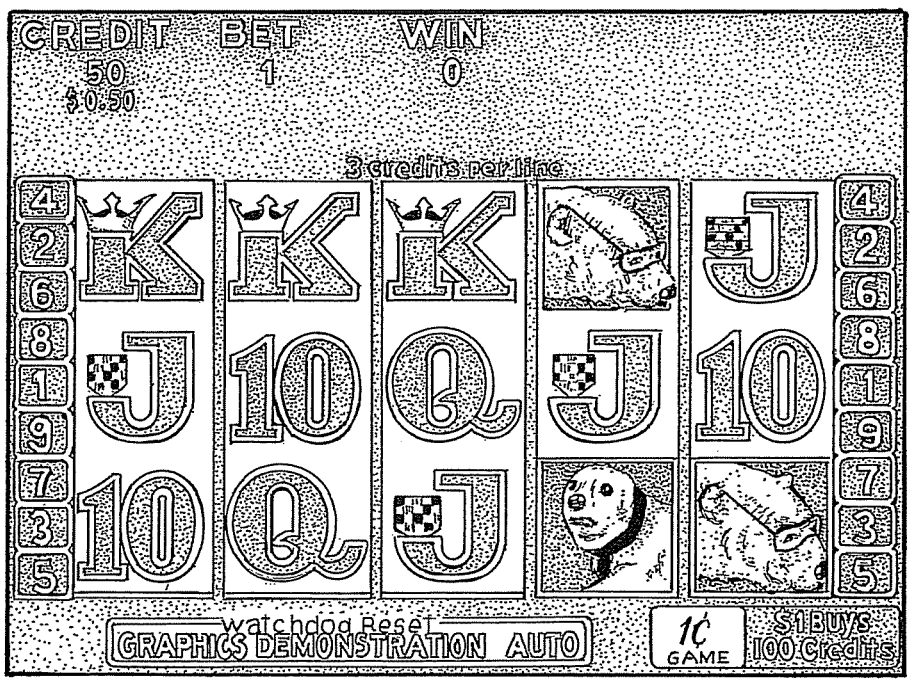
Figure 11A:
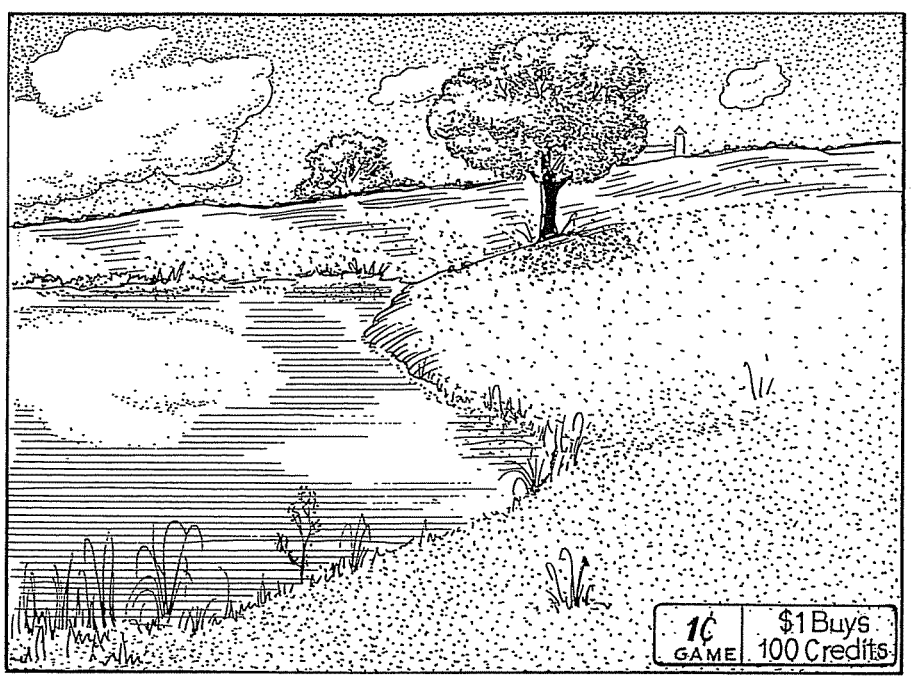
FIGS. 11a-e are a series of images illustrating the Fade transition.
Figure 11B:
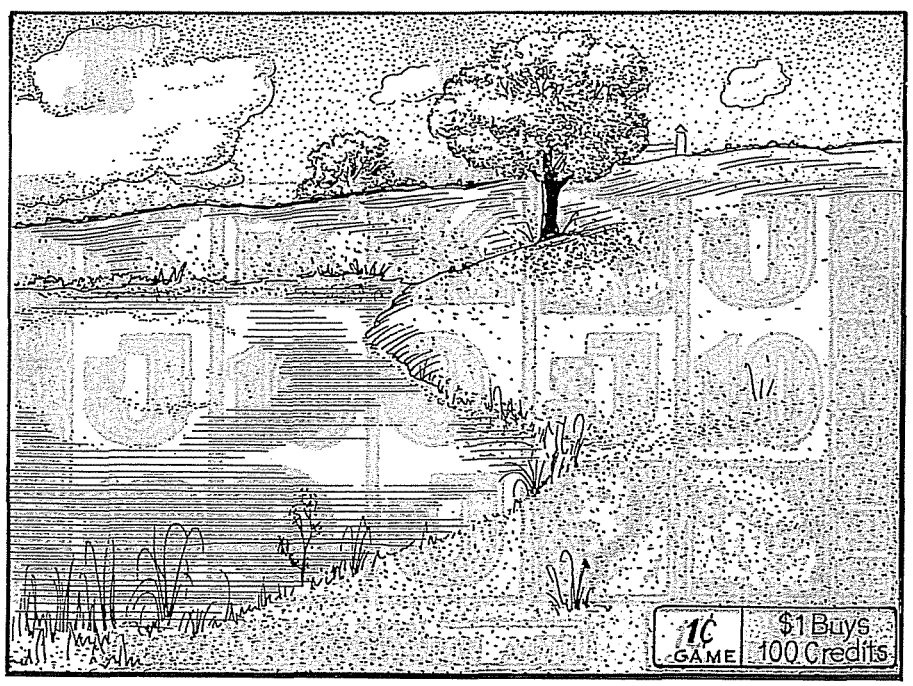
Figure 11C:
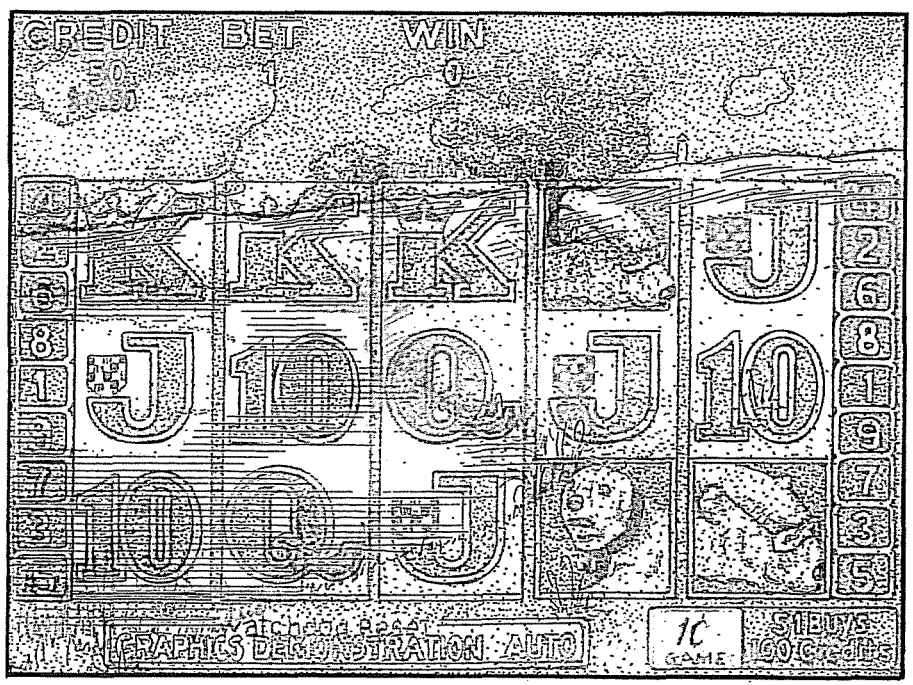
Figure 11D:
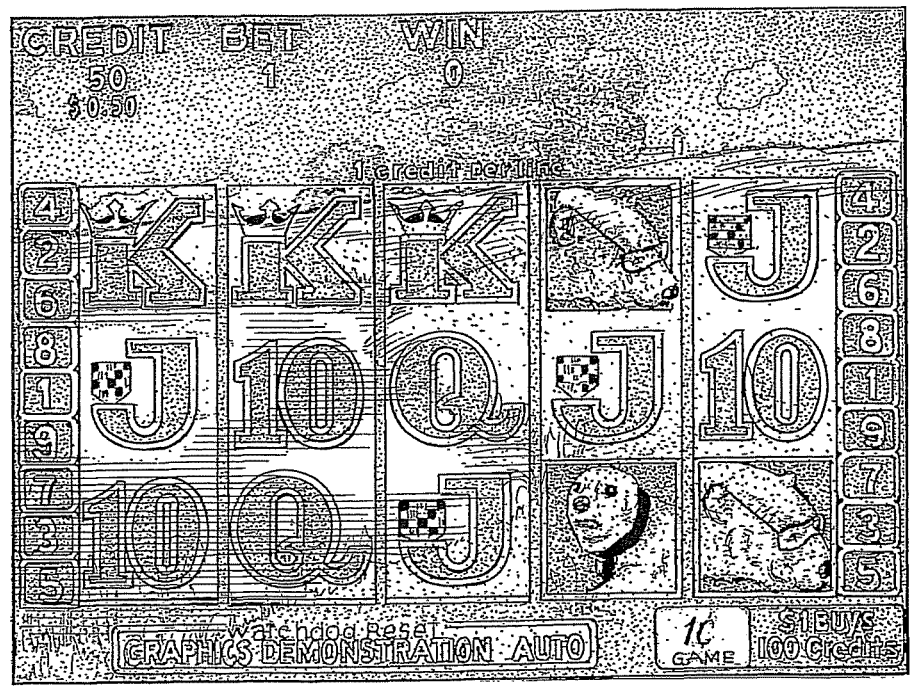
Figure 11E:
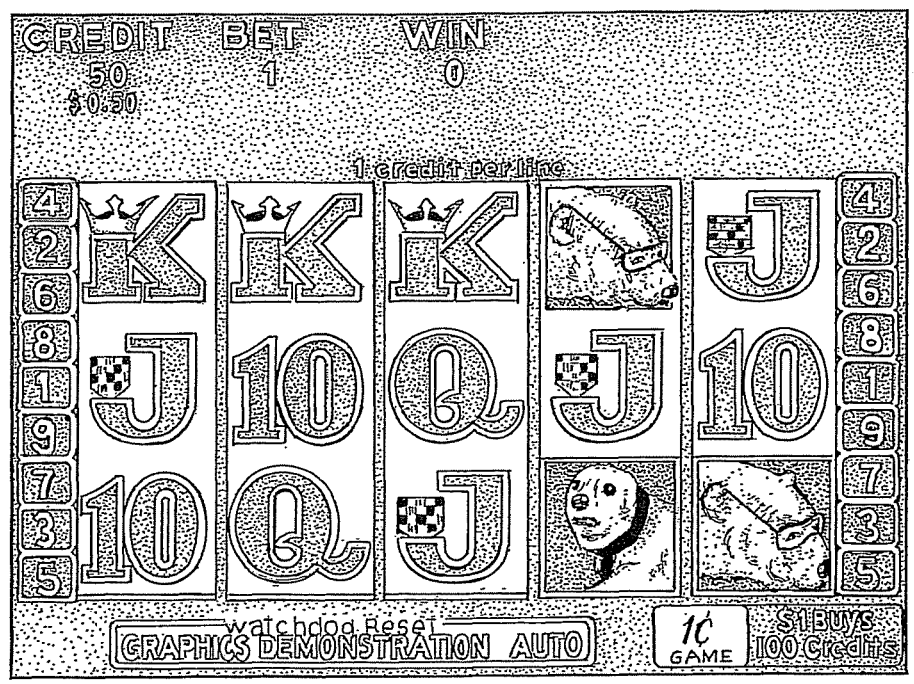
Figure 12A:
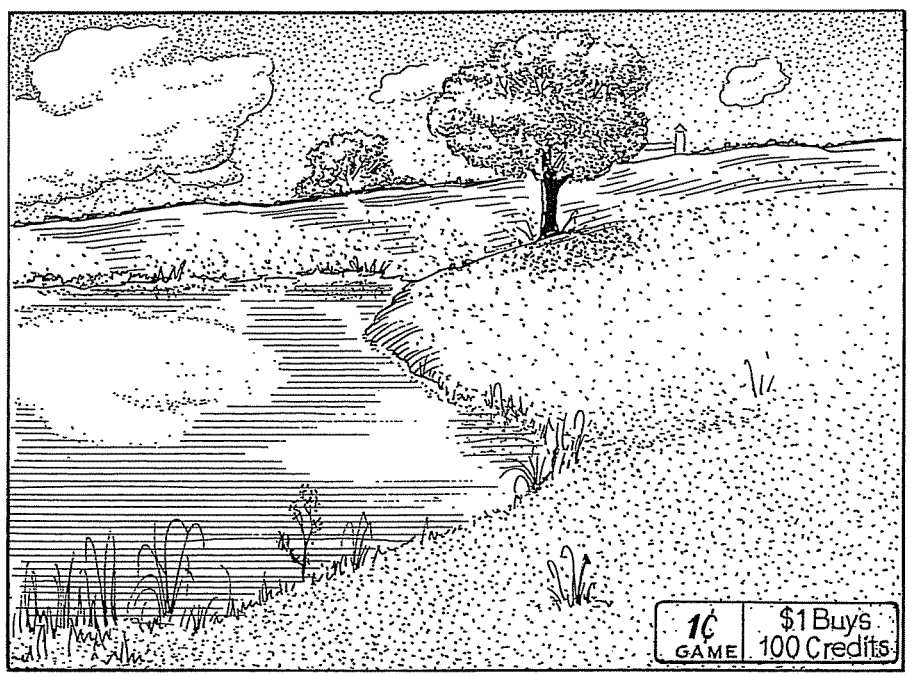
FIGS. 12a-e are a series of images illustrating the Iris transition.
Figure 12:
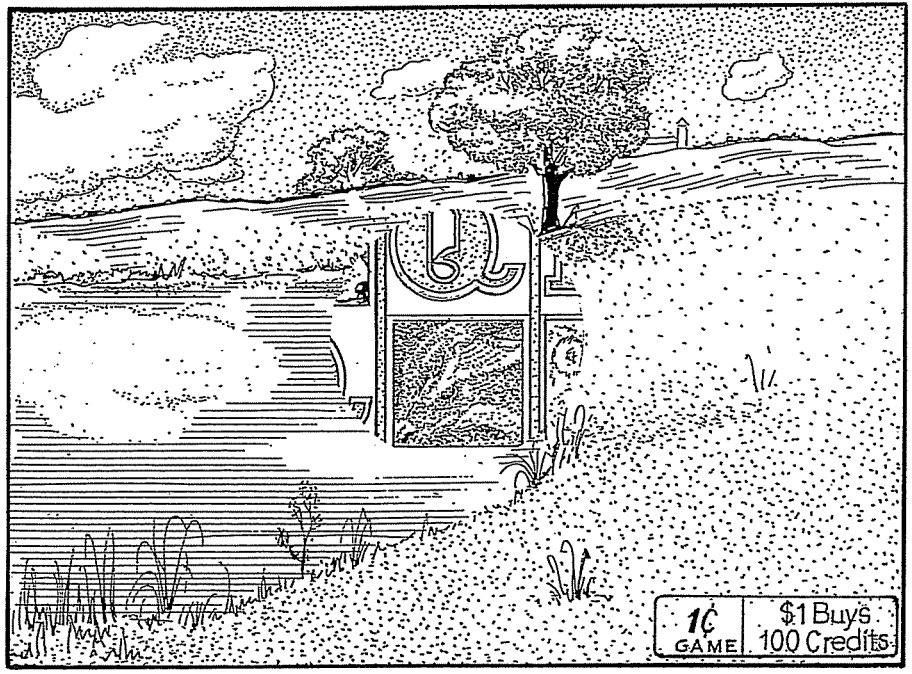
Figure 12C:
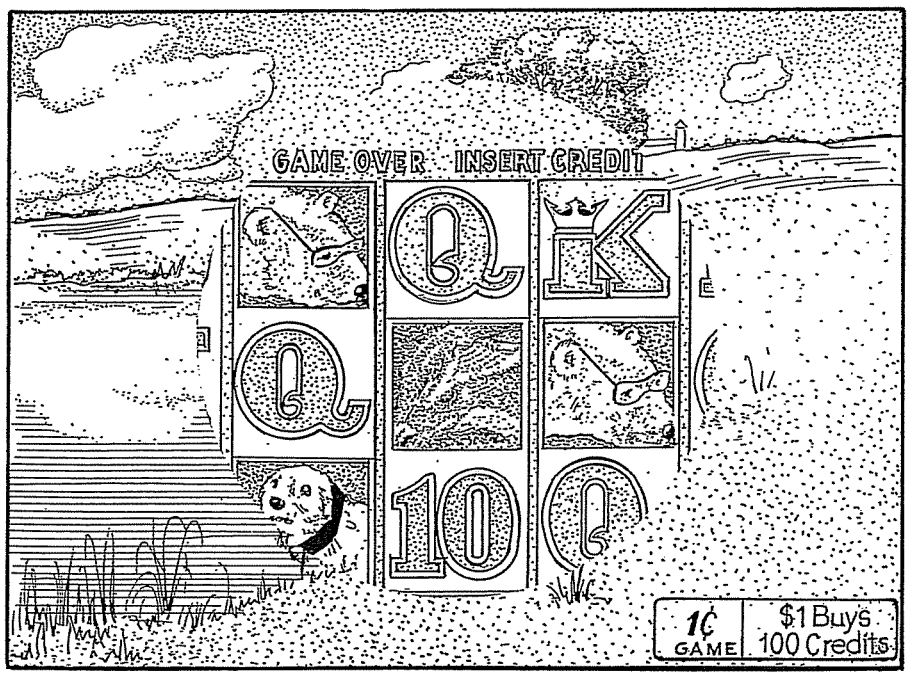
Figure 12D:
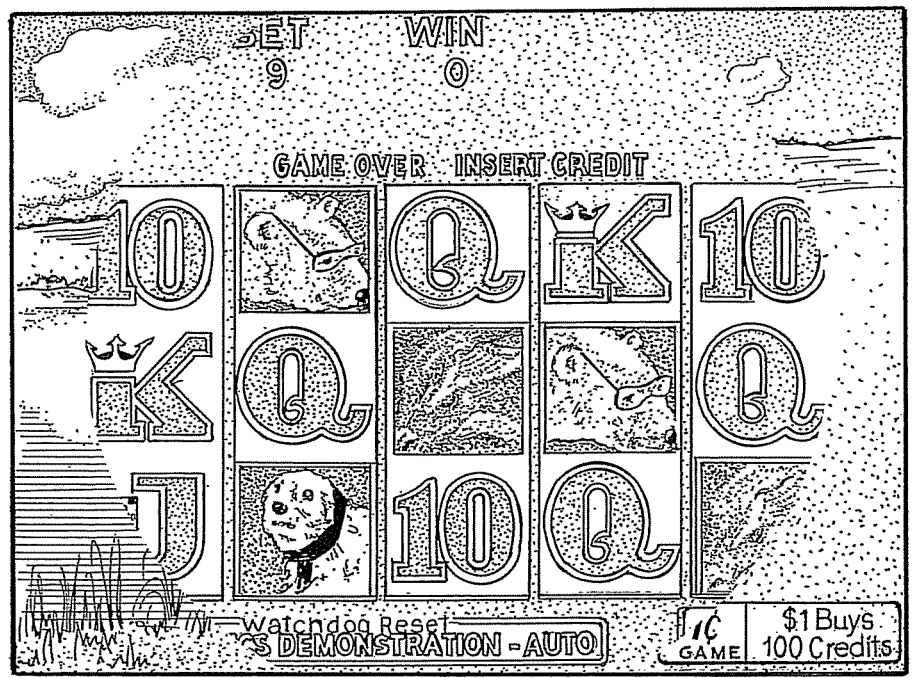
Figure 12E:
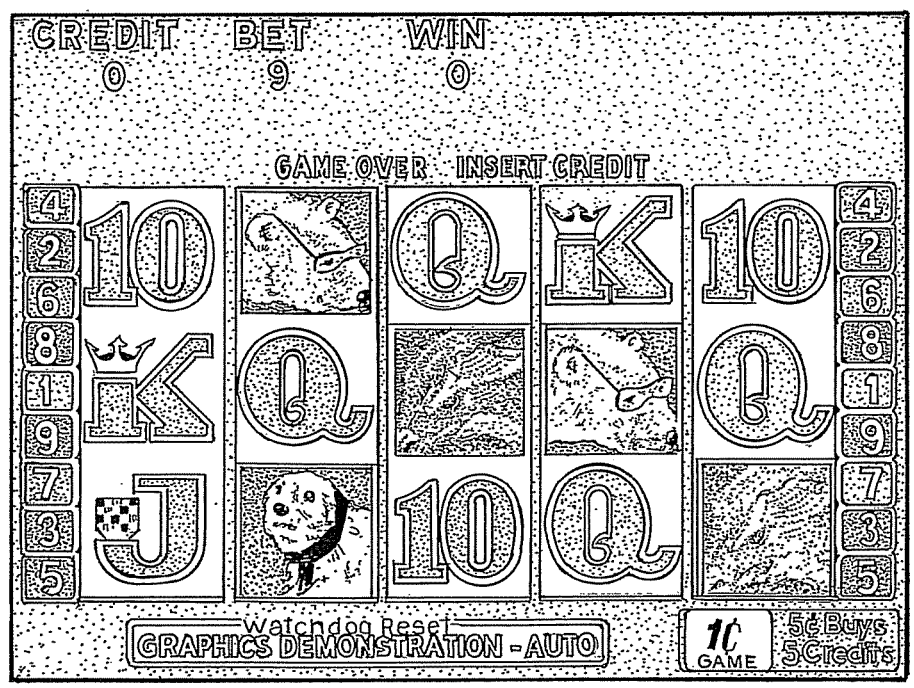

Referring to FIG. 9, there are different drawing procedures depending on whether the transition is in 2D mode or 3D mode. In 2D mode, SoftFill( ) 90 is called to fill a rectangle. FIG. 8 illustrates the division of the image into many smaller squares. A random number is chosen and the rectangle coordinates are calculated and put into a RECT structure. The SoftFill( ) function 90 is called in the following way:

SoftFill(scene→playDc[0],&area,0);

SoftFill( ) 90 instructs the current DC (Device Context) to set each pixel to '0' in the given rectangle 'area'. The for loop may get executed n times per refresh period. In this case, SoftFill( ) 90 fills n rectangles that are chosen randomly at each refresh period.

In 3D mode, a specific 3D callback, scatter _3D_cbDM 44 is celled 91 via _refresbDM( ) 43. This function 44 which performs its own OpenGL operations and divides the image into little triangles forming squares. To draw the transition image, less and less of the image is drawn each refresh period.

When the transition has ended it is removed from the DM (Display Manager). In 2D mode, t_data→generic1 is incremented each lime the SoftFill( ) function 90 is called in the for loop. The t_data→generic1 variable indicates the number of squares that have been removed already. When the t_data→generic1 variable reaches the number of squares that exist, the image is removed. The code extract below illustrates this:

```
if(t_data->generic1 == no_of_squares)
{
    remove=TRUE;
    /* free all dynamic allocated memory */
    _avlfree(t_data->randomlist);
    t_data->randomlist = (NLIST *) 0;
    break;
}
```

Once the remove variable is set to true, transition_actions( ) 32 removes the transition from the DM (Display Manager) and cleans up the code. The user may also want their own clean up code, as shown in the code extract above. The clean up code also frees the memory that was allocated for the random list of integers.

Although the Scatter transition has been described, it will be appreciated that other transitions are also envisaged. New transitions can be added by:

modifying the t_data structure to add additional t_data variables, adding the transition algorithm and timing to the transition_actions( ) function 32, and if necessary, creating a 3D callback 44 with the transition algorithm and timing.

Referring to FIGS. 10*a-e*, the Wipe transition is shown. A landscape image is gradually removed line by line from the bottom of the image, gradually exposing the underlying graphics.

Referring to FIGS. 11*a-e*, the Fade transition is shown. The image gradually fades until it is no longer visible.

Referring to FIGS. 12*a-e* the Iris transition is shown. The landscape image is gradually removed by the appearance of a "hole" in the middle of the image. The hole grows until the entire image is replaced and the underlying graphics wholly exposed.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The claims defining the invention are as follows:

1. A method of displaying images on an electronic display of a gaming machine having a transition library and a graphics engine, the method comprising:

selecting, via the graphics engine, a visual transition from a plurality of predefined visual transitions stored in the transition library;

associating, via the graphics engine, a first image of the images with display control data for the selected visual transition from the first image to a second image of the images, the images stored in a memory device;

extracting, via the graphics engine, a first set of details from the display control data that are associated with a discrete visual change related to the selected visual transition, the details including specified parameters for applying the selected visual transition;

processing, via the graphics engine, the first set of details with the first image to apply the discrete visual change of the selected visual transition to a first part of the first image;

updating, via the graphics engine, the display control data subsequent to making the discrete visual change to the first image to generate updated display control data;

extracting via the graphics engine, a second set of details from the updated display control data that are associated with a second discrete visual change related to the selected visual transition;

processing the second set of details with the first image to apply the second discrete visual change of the selected visual transition to a second part of the first image; and displaying, by the graphics engine on the electronic display, at least a part of the second image made visible by the applying of the discrete visual change and the second discrete visual change to the first image.

2. The method as claimed in claim 1, further comprising making a duplicate image of the first image, and wherein making the discrete visual change and making the other discrete visual change involve the duplicate image.

3. The method as claimed in claim 1, further comprising displaying the duplicate image on the electronic display.

4. A gaming machine comprising a graphics engine configured to display images on an electronic display, and a transition library storing a plurality of predefined visual transitions, the gaming machine configured to:

select, via the graphics engine, a visual transition from the plurality of predefined visual transactions stored in the transition library;

associate, via the graphics engine, a first image of the images with display control data for the selected visual transition from the first image to a second image of the images, the images stored in a memory device;

extract, via the graphics engine, a first set of details from the display control data that are associated with a discrete visual change related to the selected visual transition, the details including specified parameters for applying the selected visual transition;

process, via the graphics engine, the first set of details with the first image to apply the discrete visual change of the selected visual transition to a first part of the first image;

update, via the graphics engine, the display control data subsequent to making the discrete visual change to the first image to generate updated display control data;

extract, via the graphics engine, a second set of details from the updated display control data that are associated with a second discrete visual change related to the selected visual transition;

process the second set of details with the first image to apply the second discrete visual change of the selected visual transition to a second part of the first image; and display, by the graphics engine on the electronic display, at least a part of the second image made visible by the applying of the discrete visual change and the second discrete visual change to the first image.

5. The gaming machine as claimed in claim 4, wherein the graphics engine is further configured to make a duplicate image of the first image, and wherein when making the discrete visual change and making the other discrete visual change the graphics engine uses the duplicate image.

6. The gaming machine as claimed in claim 4, wherein the graphics engine is further configured to display the duplicate image on the electronic display.

7. The gaming machine as claimed in claim 4, wherein the specified parameters include at least one of a position on the electronic display where the discrete visual change is to occur, a type of the selected visual transition, a direction for the selected visual transition to occur on the electronic display, and a duration of the selected visual transition.

* * * * *